United States Patent
Ament et al.

(10) Patent No.: US 6,422,003 B1
(45) Date of Patent: Jul. 23, 2002

(54) NO$_x$ CATALYST EXHAUST FEEDSTREAM CONTROL SYSTEM

(75) Inventors: Frank Ament, Troy; David B. Brown, Brighton; David A. Frank, Rochester Hills, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/713,519

(22) Filed: Nov. 15, 2000

(51) Int. Cl.$^7$ ................................................ F02M 25/06
(52) U.S. Cl. ........................ 60/278; 60/274; 60/276; 60/285; 60/297; 60/301
(58) Field of Search ..................... 60/274, 276, 277, 60/285, 297, 301; 204/426, 425, 412

(56) References Cited

U.S. PATENT DOCUMENTS

| | | | |
|---|---|---|---|
| 5,437,153 A | | 8/1995 | Takeshima et al. ............ 60/276 |
| 5,473,887 A | * | 12/1995 | Takeshima et al. ............ 60/276 |
| 5,595,060 A | * | 1/1997 | Togai et al. .................. 60/274 |
| 5,743,084 A | | 4/1998 | Hepburn ....................... 60/274 |
| 5,771,685 A | | 6/1998 | Hepburn ....................... 60/274 |
| 5,771,686 A | | 6/1998 | Pischinger et al. ........... 60/274 |
| 5,795,545 A | * | 8/1998 | Kiropella et al. ............. 422/94 |
| 5,894,725 A | * | 4/1999 | Cullen et al. ................. 60/274 |
| 5,901,553 A | | 5/1999 | Cullen ......................... 60/274 |
| 5,974,788 A | | 11/1999 | Hepburn et al. .............. 60/274 |
| 5,983,627 A | | 11/1999 | Asik ............................ 60/274 |
| 6,023,929 A | | 2/2000 | Ma .............................. 60/295 |
| 6,161,378 A | * | 12/2000 | Hanaoka et al. .............. 60/286 |
| 6,209,316 B1 | * | 4/2001 | Duvinage et al. ............. 60/274 |
| 6,238,536 B1 | * | 5/2001 | Lundgren et al. ........... 204/426 |
| 6,244,047 B1 | * | 6/2001 | Brehob et al. ................ 60/295 |

\* cited by examiner

*Primary Examiner*—Thomas E. Denion
(74) *Attorney, Agent, or Firm*—Anthony Luke Simon

(57) ABSTRACT

An improved method of "adaptive" control that optimizes NO$_x$ conversion efficiency while minimizing fuel consumption. This method limits the NO$_x$ level in the feedstream to a NO$_x$ catalyst to a level that the catalyst can process by adjusting certain engine parameters, namely exhaust gas recirculation percentage, air-to-fuel ratio, and spark ignition timing in a spark-ignition engine or fuel injection timing in a compression-ignition engine. This method results in improved fuel efficiency over previous methods of controlling NO$_x$ emissions by allowing longer periods of lean operations.

11 Claims, 4 Drawing Sheets

$NO_x$ CATALYST EXHAUST FEEDSTREAM CONTROL SYSTEM

BACKGROUND OF THE INVENTION

1. Field of the Invention

The present invention relates, in general, to internal combustion engine control systems and, specifically, to an internal combustion engine control system capable of controlling $NO_x$ emissions.

2. Description of the Art

It is known in the art relating to internal combustion engines that operating an engine with a lean mixture of fuel and air improves efficiency of the engine. This means that for a given amount of work performed by the engine, less fuel will be consumed, resulting in improved fuel efficiency. It is also well known that reduction of $NO_x$ emissions when the fuel rate is lean is difficult to achieve, resulting in an almost universal use of stoichiometric operation for exhaust control of automotive engines. By operating an engine with a stoichiometric mixture of fuel and air, fuel efficiency is good and $NO_x$ emission levels are reduced by over 90% once the vehicle catalyst reaches operating temperatures.

In addition to air-to-fuel ratio, other parameters involved in the combustion process affect the level of $NO_x$ emitted from the engine. Exhaust gas recirculation, for example, is a process by which a portion of the exhaust gas produced from the engine is conducted back to the combustion chamber to reduce peak combustion temperatures. Because high combustion temperatures result in high $NO_x$ emissions, increasing the percentage of exhaust gas recirculated in the combustion process reduces $NO_x$ emissions. However, the level of exhaust gas recirculated into the combustion process is limited because excessive amounts would halt combustion.

Another parameter that affects $NO_x$ emissions from the engine is spark ignition timing in spark-ignition engines or, in the case of compression-ignition engines (diesels), fuel injection timing. The timing of spark ignition or fuel injection, whichever is applicable, in the combustion sequence affects both emissions and fuel consumption. To reduce $NO_x$ emissions, the engine's timing is retarded from its baseline—the point of optimum fuel economy—lowering peak combustion temperature, increasing exhaust gas temperature, and increasing the amount of fuel burned. Since this decrease in $NO_x$ emissions occurs at the expense of increased fuel consumption, retard of an engine's ignition or injection timing, whichever is appropriate, is subject to a maximum limit.

Because lean operation of the engine improves fuel efficiency, maximizing lean operating time is desirable. Catalysts and engine control technologies operate to minimize $NO_x$ emissions during lean operation of the engine. Two types of $NO_x$ catalyst devices are standard in the art. Most common is the $NO_x$ adsorber, which stores $NO_x$ emissions during fuel lean operations and allows release of the stored emissions during fuel rich conditions with conventional three-way catalysis to nitrogen and water. The other is the $NO_x$ converter, which continuously converts $NO_x$ emissions as the exhaust feedstream flows through the converter.

These $NO_x$ catalyst devices, however, are not 100% effective in reducing $NO_x$ emissions from vehicles under all operating conditions. Attempts to compensate for various operating conditions relied on controlling the amount of emissions in the feedstream through an indirect measure of catalyst efficiency. A signal from an oxygen sensor mounted after the catalyst controlled the air-to-fuel ratio in the cylinders. The presence of oxygen, as measured by the oxygen sensor, indicated the condition where $NO_x$ emissions were not being efficiently removed by the catalyst.

The catalyst was thus regenerated, or stoichiometric fueling was forced, both of which can lead to a loss in fuel efficiency.

Thus, it would be desirable to provide a means of directly controlling the $NO_x$ emissions in the feedstream to a level the catalyst can process efficiently under varying operating conditions to provide optimum emission control and improve fuel efficiency.

SUMMARY OF THE INVENTION

The present invention is a method for controlling $NO_x$ emissions in an internal combustion engine by monitoring the exhaust gases flowing from the engine to the $NO_x$ catalyst, detecting when this feedstream $NO_x$ is above the level of efficient processing by the $NO_x$ catalyst, and adjusting certain engine parameters to reduce the $NO_x$ level in the feedstream to a level the $NO_x$ catalyst can efficiently process. In this way, emissions of $NO_x$ are minimized while fuel efficiency is maximized.

Once the engine is operating, the engine-out $NO_x$ rate is calculated. Engine-out $NO_x$ rate is the level of $NO_x$ in the feedstream being processed by the $NO_x$ catalyst. The engine-out $NO_x$ rate can be modeled using known engine operating conditions or calculated from measurements obtained using existing sensor technology.

The control proceeds to calculate a maximum permissible engine-out $NO_x$ rate. The maximum permissible engine-out $NO_x$ rate is a function of $NO_x$ catalyst efficiency. $NO_x$ catalyst efficiency is a measure of the amount of $NO_x$ the catalyst can process, which is a function of certain characteristics of the catalyst feedstream, namely the temperature of the catalyst and the $NO_x$ level seen by the catalyst.

If the engine-out $NO_x$ rate is less than or equal to the maximum engine-out $NO_x$ rate, then the catalyst is not receiving more $NO_x$ than it can process. Since the engine is operating in a fuel efficient region, and $NO_x$ emissions are minimized, adjustments to engine parameters are not required. The control sequence then begins again with the determination of the engine-out $NO_x$ rate. When the engine-out $NO_x$ rate is greater than the maximum engine-out $NO_x$ rate, the catalyst is receiving more $NO_x$ than it can efficiently process. The control sequence then performs steps to increase at least one of the following engine parameters to reduce the engine-out $NO_x$ rate: exhaust gas recirculation; air-to-fuel ratio; and ignition or injection retard. Which order the adjustments are made in depends upon what type of $NO_x$ catalyst is in use, whether the engine is a spark-ignition or a compression-ignition engine, and the totality of engine operating conditions.

In one aspect of the present invention, under normal operating conditions in a spark-ignition engine where the $NO_x$ catalyst is in an adsorber, the exhaust gas recirculation (EGR) percentage is increased first, if possible, to reduce the engine-out $NO_x$ rate. The exhaust gas recirculation (EGR) percentage is compared to a pre-determined maximum EGR rate. If the percentage of EGR is less than the maximum EGR rate, the percentage of EGR is increased by a pre-determined increase factor according to conventional methods of increasing the amount of exhaust gas recirculated. The control sequence then begins again with the determination of the engine-out $NO_x$ rate at the engine's new operating point.

If, however, the percentage of EGR is at its maximum EGR rate, then no changes in exhaust gas recirculated are made. The air-to-fuel ratio (A/F ratio) is compared to a pre-determined maximum A/F ratio. If the A/F ratio is less than a maximum A/F ratio, then the A/F ratio is increased by a pre-determined increase factor according to conventional methods of increasing cylinder fuel level. The control sequence then begins again with the determination of the engine-out $NO_x$ rate at the engine's new operating point.

If, however, the A/F ratio is at its maximum A/F ratio, then the engine timing is compared to a pre-determined maximum value for engine timing. This maximum value for engine timing corresponds to the maximum allowable retard of an engine's ignition or injection timing. In a spark-ignition engine, engine timing is spark ignition timing. In a compression-ignition engine, engine timing is fuel injection timing. If the engine timing is at the value indicating maximum retard, then the control sequence begins again with the determination of the engine-out $NO_x$ rate. If the engine timing is less than the value indicating maximum retard, then the retard indicated by the engine timing is increased by a calculated increase factor according to conventional methods of increasing retard in engine timing. The control sequence then begins again with the determination of the engine-out $NO_x$ rate at the engine's new operating point.

The method for controlling $NO_x$ emissions of the present invention provides several unique features not found in previously devised methods for controlling $NO_x$ emissions. First, the method directly controls the level of engine-out $NO_x$ seen by the catalyst to a level that the catalyst can efficiently process, maximizing the amount of time the engine is able to operate lean.

Second, while methods of controlling exhaust gas recirculation and engine timing are well-known in the art, they have not been previously used to maximize lean engine operation as disclosed in the present invention.

BRIEF DESCRIPTION OF THE DRAWINGS

The various features, advantages and other uses of the present invention will become more apparent by referring to the following detailed description and drawings in the which.

DETAILED DESCRIPTION

Figure 1:
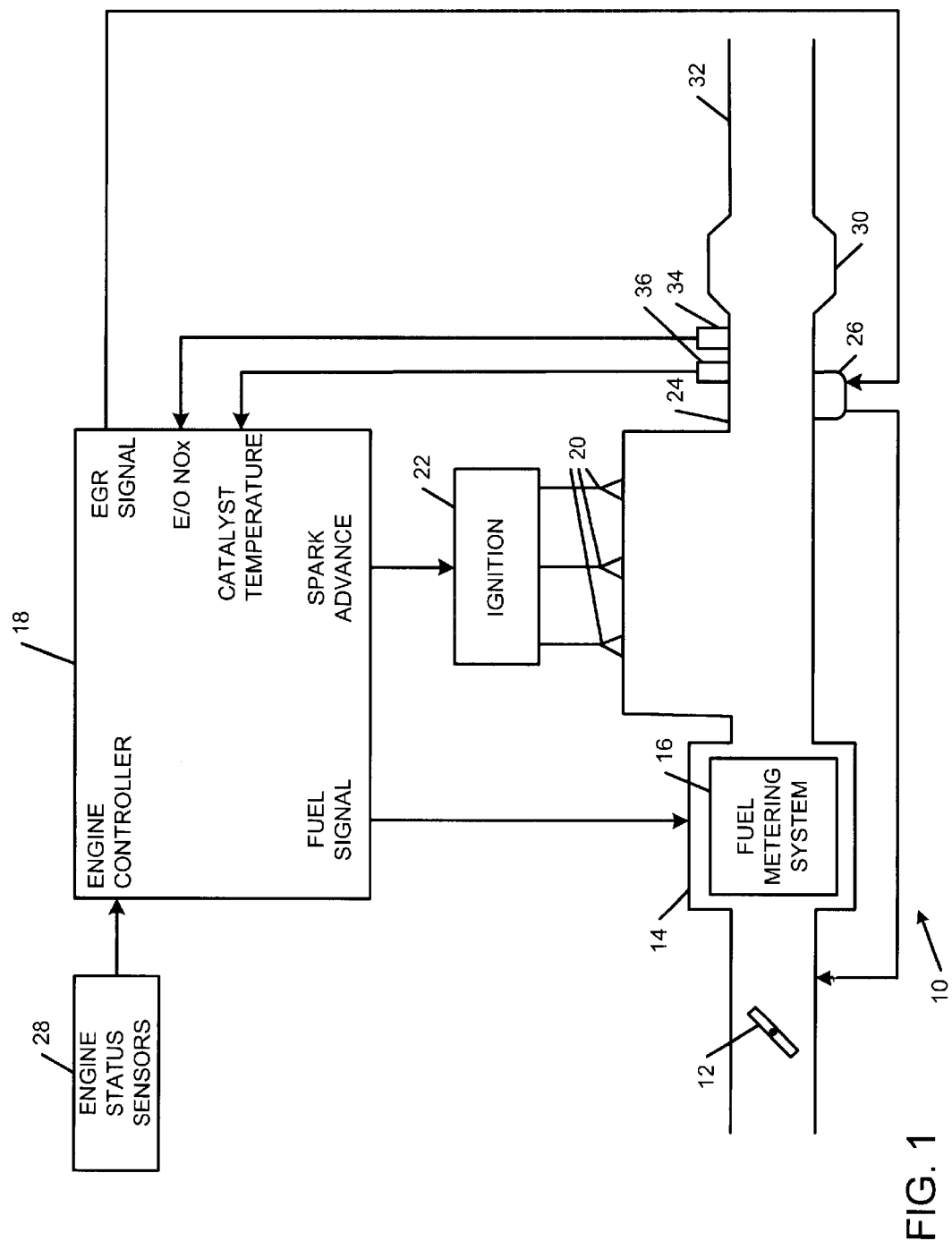
FIG. 1 is a pictorial diagram of a spark-ignition engine and engine control hardware involved in carrying out the method of the present invention.

Referring to FIG. 1, an internal combustion engine 10 receives intake air through a throttle 12 to an intake manifold 14 for distribution to engine cylinder intake air runners (not shown). In the spark-ignition engine, a fuel metering system 16 meters fuel for mixing with the intake air to form fuel-air mixtures flowing into the engine through the intake manifold 14. A FUEL SIGNAL, sent from an engine controller 18 to the fuel metering system 16, controls the amount of fuel in the fuel-air mixtures. In a compression-ignition engine, the intake air is not mixed with the fuel in the intake manifold 14. The intake air flows into the engine cylinders (not shown), and the fuel is injected directly into the air in the cylinders just prior to combustion. In the compression-ignition engine, the timing of the fuel injection, in addition to the amount of fuel injected, is controlled by the FUEL SIGNAL upon a signal by the controller 18.

In spark-ignition engines, the fuel-air mixtures are ignited in the engine cylinders by an electrical spark produced by a spark plug 20 disposed in each cylinder. The spark plugs 20 are ignited by a signal from the ignition system 22, which uses as one of its inputs a SPARK ADVANCE signal generated from the controller 18.

The controller 18 may be a conventional microcontroller which includes such elements as a central processing unit (CPU), read only memory, random access memory, input/output control circuitry, and analog to digital conversion circuitry. The controller 18 is activated upon application of ignition power to an engine. When activated, the controller 18 carries out a series of operations stored in an instruction-by-instruction format in memory for providing engine control, diagnostic and maintenance operations.

In either a spark-ignition or a compression-ignition engine, exhaust gases produced in the engine cylinder combustion process flow out of engine cylinders and through one or more exhaust gas conduits 24. A portion of the exhaust gases are fed back to the intake manifold 14 through an exhaust gas recirculation (EGR) valve 26, controlled by an EGR SIGNAL from the controller 18. The remainder of the exhaust gases pass through a NOx catalyst 30 and are emitted through a tailpipe 32.

Associated with the engine 10 are certain engine status sensors 28 (not shown in detail) used to monitor performance of the engine and report certain parameters to the controller 18. Among the reported parameters of the status sensors 28 are engine speed (K_NOx_RPM), air-to-fuel ratio (K_AF_Ratio), EGR valve position (K_%_EGR_Factor), air volume per cylinder (K_Cyl_Load_Factor), and spark ignition (K_Spk_Adv_Factor) or fuel injection timing.

The function of the $NO_x$ catalyst 30 is to reduce engine produced $NO_x$ emissions, allowing the engine 10 to run lean and within acceptable emission levels. In one aspect, the $NO_x$ catalyst 30 is in an adsorber that reduces $NO_x$ emissions by storing the $NO_x$ emissions during lean operations, then purges them during a short fuel rich cycle. In another aspect, the $NO_x$ catalyst 30 is in a conventional catalytic converter, which continuously processes $NO_x$ emissions.

In a preferred aspect, an exhaust $NO_x$ sensor 34 is disposed prior to the $NO_x$ catalyst 30 for monitoring the concentration of $NO_x$ within the feedstream and providing an engine output $NO_x$ emission level (E/O $NO_x$), which is received and analyzed by an engine controller 18. The controller 18 determines whether the $NO_x$ emissions in the feedstream to the catalyst meet the performance requirements of the $NO_x$ catalyst 30 at a point where emissions and fuel consumption are minimized. If not, the controller 18 makes necessary adjustments to certain engine parameters, namely to the FUEL SIGNAL and the EGR SIGNAL and, in a spark-ignition engine, the SPARK ADVANCE.

Generally, this procedure provides for $NO_x$ control in a $NO_x$ catalyst 30 to minimize emissions and maximize fuel efficiency. More specifically, such an operation is initiated at step 100 in FIG. 2 upon application of ignition power to a previously inactive controller 18 and proceeds to carry out general initialization operations in step 102. Such initialization operations include setting pointers, flags, registers and RAM variables to their starting values. These starting values could be predetermined or learned and stored from previous operating events such that they can be used for the next event without having to relearn from a pre-established baseline.

Following general initialization operations, a query is made as to whether the engine-out $NO_x$ rate (E/O $NO_x$ rate) is calculated using the $NO_x$ sensor 34, shown in FIG. 1. In one aspect, where the answer to the query in step 108 is yes, the E/O $NO_x$ rate (g/sec) is determined by use of the $NO_x$ sensor 34. In step 110 of FIG. 2, the sensor 34 is read and stored. The sensor 34 should be capable of providing a signal corresponding to $NO_x$ concentration in the feedstream, typically at levels of 50–2000 ppm. The $NO_x$ concentration indicated by the sensor 34, E/O $NO_x$ is used to calculate the E/O $NO_x$ rate in step 112 by multiplying E/O $NO_x$ by a conversion factor (K_Conversion_Factor) and the amount of air flowing through the exhaust gas conduits 24 (Air_Flow), according to the following formula:

$$\text{E/O } NO_x \text{ rate} = \text{E/O } NO_x * \text{Air\_Flow} * \text{K\_Conversion\_Factor}.$$

The determination of Air_Flow is well-known in the art, and generally involves the use of an air meter device measuring the air into the intake manifold 14, or is calculated according to various methods. One method of calculating Air_Flow is by applying the following formula:

$$\text{Air\_Flow} = \text{RPM} * \text{MAP} * \text{Engine displacement}/2 * \text{volumetric efficiency},$$

where RPM is engine speed and MAP is manifold air pressure. Engine displacement is the volume of air displaced as the engine rotates through two complete revolutions. Volumetric efficiency depends on engine design parameters such as piston size, piston stroke and number of cylinders, and is a measure of how well the engine functions as an air pump.

Returning to step 108, the answer in step 108 is no if the $NO_x$ sensor 34 is not used to calculate the E/O $NO_x$ rate. A $NO_x$ model incorporating actual operating conditions is used to calculate the E/O $NO_x$ rate. The control sequence proceeds to step 114, which indicates a transition between FIG. 2 and FIG. 3 for the block diagram of the inventive method.

Figure 2:
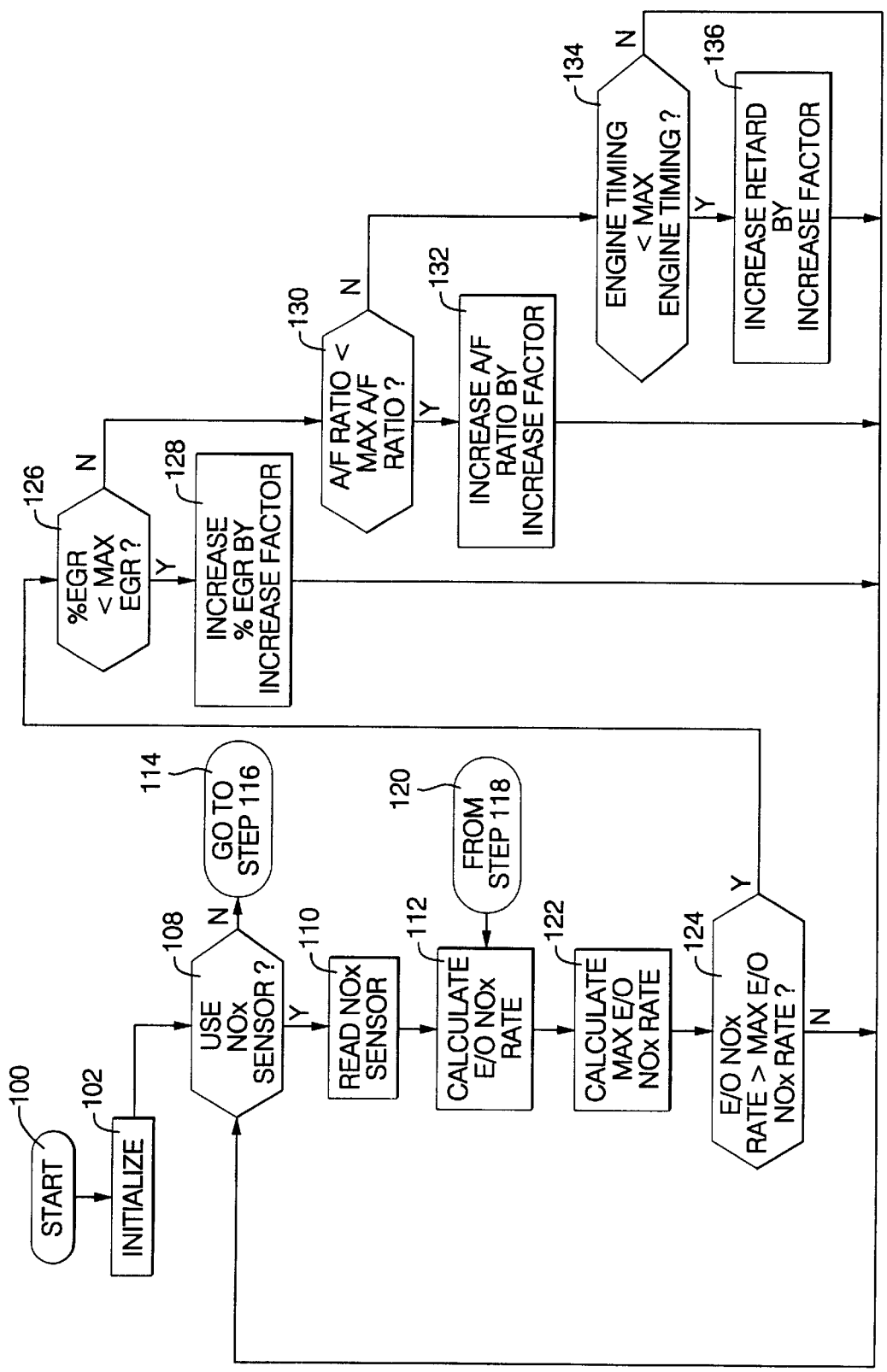
FIGS. 2 and 3 are a block diagrams illustrating a flow of operations for carrying out a method of this invention using the hardware of FIG. 1.
Figure 3:
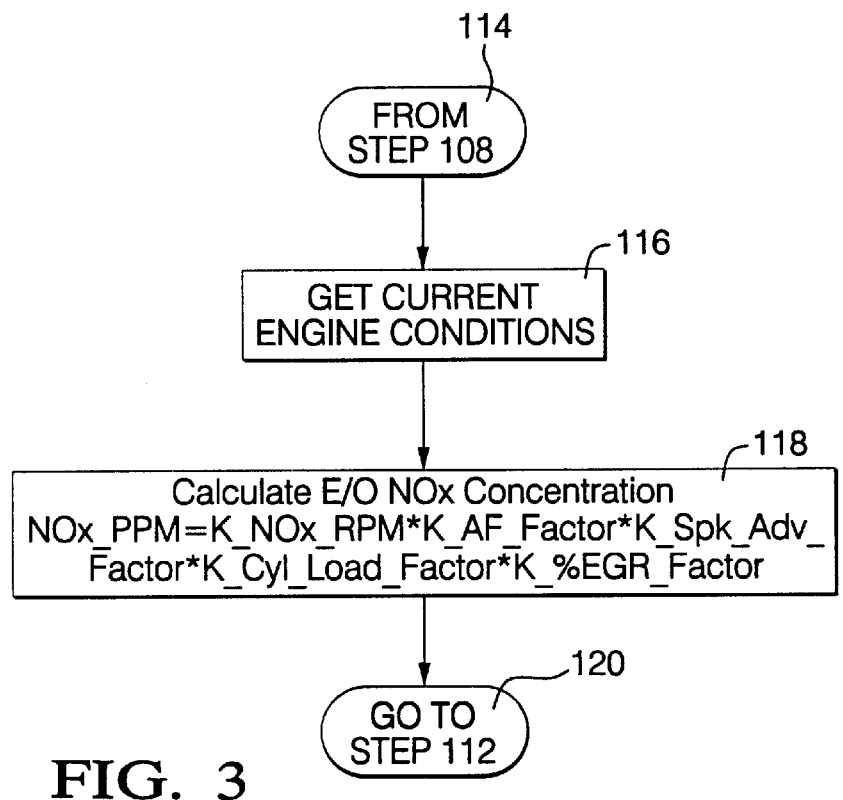

Referring now to FIG. 3, step 114 from FIG. 2 is repeated to indicate a continuation of the block diagram of FIG. 2. In step 116, actual operating conditions are sampled. The conditions looked to—engine speed (K_NOx_RPM), air-to-fuel ratio (K_AF_Ratio), spark ignition timing (K_Spk_Adv_Factor), EGR valve position (K_% EGR_Factor), and air volume per cylinder (K_Cyl_Load_Factor)—are represented in FIGS. 4A through 4E. In a compression-ignition engine, fuel injection timing is used in place of spark ignition timing. Returning to FIG. 3, E/O $NO_x$ concentration is calculated in step 118 by multiplying the sampled conditions together according to the following formula:

$$\text{E/O } NO_x \text{ concentration} = (\text{K\_NOx\_RPM}) * (\text{K\_AF\_Ratio}) * (\text{K\_Spk\_Adv\_Factor}) * (\text{K\_\% EGR\_Factor}) * (\text{K\_Cyl\_Load\_Factor}).$$

The control sequence proceeds to step 120, which indicates a transition between FIG. 3 and FIG. 2 for the block diagram of the inventive method.

Referring now to FIG. 2, step 120 from FIG. 3 is repeated to indicate a continuation of the block diagram of FIG. 3. Then, the concentration calculated from actual operating conditions in step 118 of FIG. 3 is used to calculate the E/O $NO_x$ rate in step 112 of FIG. 2 by multiplying the resultant E/O $NO_x$ concentration by a conversion factor (K_Conversion_Factor) and the amount of air flowing through the exhaust gas conduits 24 (Air_Flow), in accordance with the following formula:

$$\text{E/O } NO_x \text{ rate} = \text{E/O } NO_x \text{ concentration} * \text{Air\_Flow} * \text{K\_Conversion\_Factor}.$$

Figure 5:
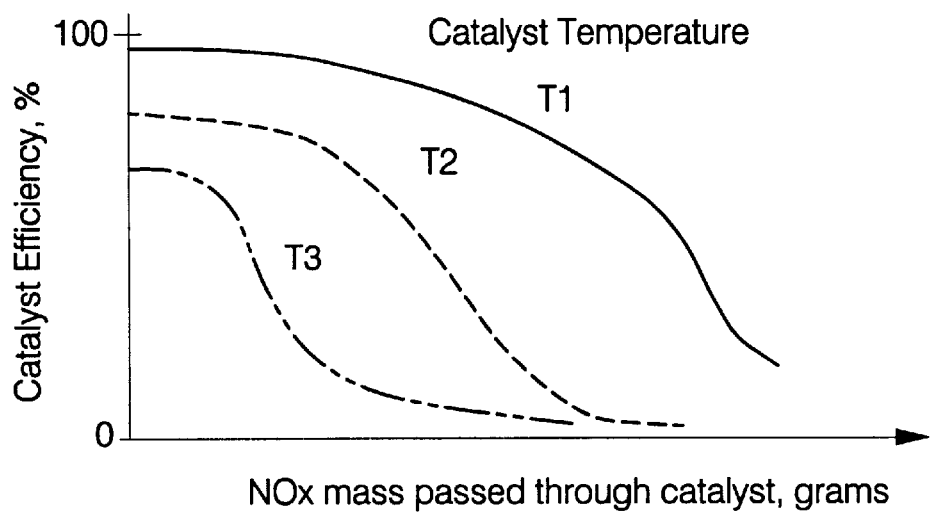
FIG. 5 is a graph illustrating the catalyst efficiency as a function of both the catalyst temperature and the amount of $NO_x$ emissions passed through the catalyst.
Figure 4A:
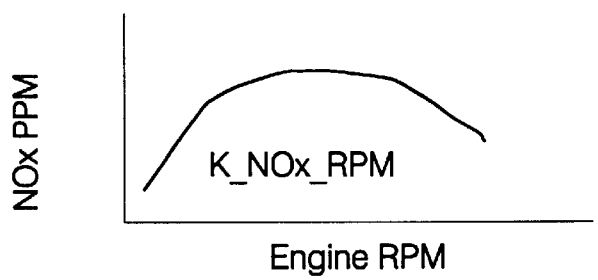
FIGS. 4A through 4E are graphs illustrating the input variables into the model used to calculate the engine-out $NO_x$ rate in one aspect of the present invention.
Figure 4B:
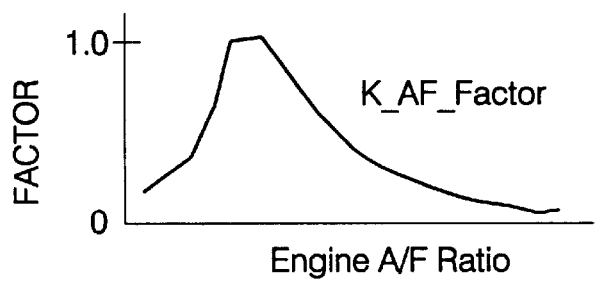
Figure 4C:
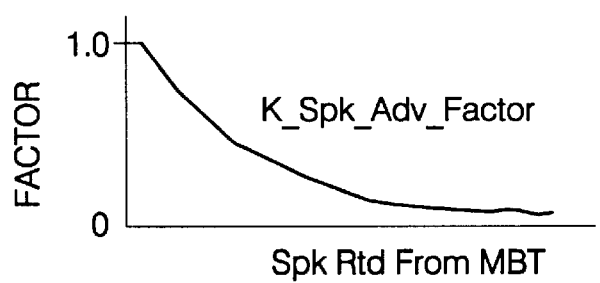
Figure 4D:
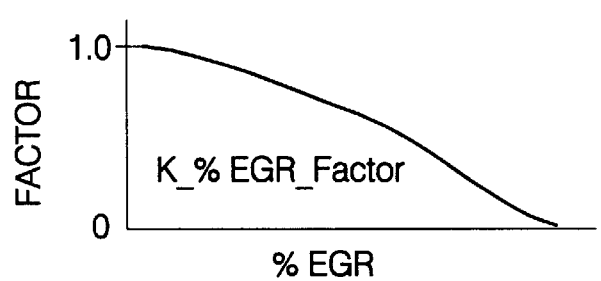
Figure 4E:
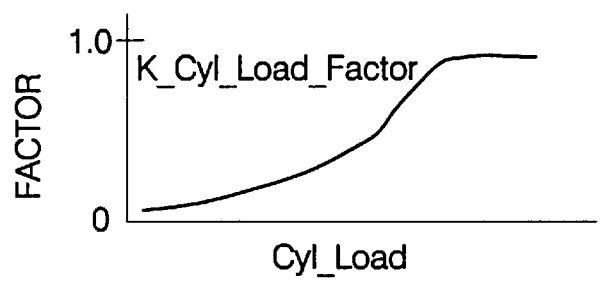

After the E/O $NO_x$ rate is calculated and stored in step 112, the maximum permissible E/O $NO_x$ rate is calculated and stored in step 122 according to the following formula:

$$\text{maximum E/O } NO_x \text{ rate} = \text{E/O } NO_x \text{ rate} * \text{Catalyst Efficiency},$$

where E/O $NO_x$ rate is that calculated in step 112 and Catalyst Efficiency is preferably determined from look-up tables or mathematical models of known catalyst efficiency curves, which curves are illustrated in FIG. 5. Which catalyst efficiency curve is appropriate depends on catalyst temperature. Along with the correct efficiency curve, the mass of $NO_x$ passed through the catalyst is used to determine Catalyst Efficiency.

One method of determining catalyst temperature, which will indicate which catalyst efficiency curve is appropriate, is to use a mathematical model or lookup table based on the known relationship of Air_Flow to exhaust gas temperature. Exhaust gas temperature is equivalent to the temperature the catalyst sees. In a less preferred aspect, a temperature sensor is inserted in the feedstream to detect exhaust gas temperature, and therefore catalyst temperature, indicating along which catalyst efficiency curve the catalyst is operating. The temperature sensor, if used, preferably would be combined with the $NO_x$ sensor 34, but it could be a stand-alone sensor.

Where along the catalyst efficiency curve the catalyst is operating is determined by integrating the E/O $NO_x$ rate calculated in step 112 of FIG. 2 over a pre-determined time interval, preferably one minute. This step provides the $NO_x$ mass passed through the catalyst in grams. Using the temperature and the $NO_x$ mass, the Catalyst Efficiency is calculated and stored in step 122 of FIG. 2 using either a mathematical model or a look-up table based on the curves shown in FIG. 5.

Returning to FIG. 2, in step 124 the E/O $NO_x$ rate stored in step 112 is compared to the maximum permissible E/O $NO_x$ rate stored in step 122. If the actual rate is less than or equal to the maximum permissible rate, the engine is operating in a fuel efficient region with low $NO_x$ emissions. The control sequence begins again by returning to step 108. If the actual E/O $NO_x$ rate is greater than the maximum permissible rate, then steps are taken to reduce the actual E/O $NO_x$ rate through the adjustment of engine parameters. In one aspect, an effort is first made to reduce the rate through increase in the percentage of exhaust gas recirculated (EGR). In step 126, the percentage of EGR is measured and compared to a pre-determined maximum value for EGR. If the percentage of EGR is less than its maximum value, the percentage of EGR is increased in step 128 through the EGR SIGNAL by an EGR increase factor. The control sequence then returns to step 108.

Returning to step 126, if the percentage of EGR is not less than its maximum value, then the percentage of EGR is at its maximum value. Further increases in the percentage of EGR are not acceptable. Preferably, the air-to-fuel ratio (A/F ratio) is analyzed next. In step 130, the A/F ratio is compared to a pre-determined maximum A/F ratio. If the A/F ratio is less than the maximum A/F ratio, then the A/F ratio is increased by an A/F increase factor in step 132 by reducing the amount of fuel burned in the cylinders through the FUEL SIGNAL. The control sequence then returns to step 108.

Returning to step 130, if the A/F ratio is not less than its maximum value, then the A/F ratio is at its maximum value. Further increases in the A/F ratio are not acceptable. The control sequence thus proceeds to attempt to adjust the engine timing to reduce $NO_x$ in the feedstream. In the spark-ignition engine, engine timing is spark ignition timing, which is controlled by the SPARK ADVANCE. In the compression-ignition engine, engine timing is fuel injection timing, which is controlled by the FUEL SIGNAL. In step 134, the engine timing is compared to a predetermined maximum value for engine timing corresponding to the maximum allowable retard in the timing of the engine. If the engine timing is less than this maximum value, the amount of retard in the engine timing is increased by a retard increase factor in step 136. The control sequence then returns to step 108.

Returning to step 134, if the engine timing is not less than the maximum value for engine timing, then the engine timing is at the maximum allowable retard. Further adjustments in SPARK ADVANCE or the FUEL SIGNAL are not acceptable. The control sequence returns to step 108.

The order of adjusting engine parameters as discussed herein is a preferred order where the $NO_x$ catalyst is an adsorber, and the engine is a spark-ignition engine. However, the order of adjustments is not limited to the disclosed sequence. In other situations, a different order of adjustments would likely be more effective at minimizing $NO_x$ emissions while maximizing fuel efficiency.

In summary, there has been disclosed a unique method of "adaptive" control that optimizes $NO_x$ catalyst efficiency while minimizing fuel consumption. This method optimizes the $NO_x$ level in the feedstream to a $NO_x$ catalyst by adjusting certain engine parameters, such as exhaust gas recycle, A/F ratio, and engine timing, while compensating for changes in the engine control system, fuel properties and catalyst activity. This method results in improved fuel efficiency over previous methods of controlling $NO_x$ emissions because it minimizes catalyst regeneration events or forced stoichiometric fueling.

What is claimed is:

1. A method of controlling feedstream $NO_x$ in an engine supplied to a $NO_x$ catalyst, comprising the steps of:
   determining a level of engine-out $NO_x$ emissions entering the $NO_x$ catalyst;
   determining a maximum level of engine-out $NO_x$ emissions processed by the $NO_x$ catalyst;
   comparing the level of engine-out $NO_x$ emissions to the maximum level of engine-out $NO_x$ emissions; and
   performing at least one of the following steps when the engine-out $NO_x$ emissions are greater than the maximum $NO_x$ level processed by the $NO_x$ catalyst:
   A) increasing the percentage of exhaust gas recirculated by a first increase factor;
   B) increasing the air-to-fuel ratio by a second increase factor; and
   C) increasing the retard in the engine timing by a third increase factor, wherein the step of determining the maximum $NO_x$ level processed by the $NO_x$ catalyst is performed by using a temperature sensor disposed upstream of the $NO_x$ catalyst and wherein the step of determining the maximum $NO_x$ level is calculated by the following formula:
   maximum E/O $NO_x$ rate=E/O $NO_x$ rate * Catalyst Efficiency.

2. The method of claim 1 wherein the Catalyst Efficiency is determined from at least one of look-up tables and mathematical models of a catalyst efficiency curve.

3. The method of claim 2 wherein the catalyst efficiency curve depends on a catalyst temperature.

4. The method of claim 3 wherein the catalyst temperature is determined by the temperature sensor.

5. The method of claim 1 wherein the $NO_x$ catalyst is in an adsorber and the steps, A, B and C are performed in the stated sequential order.

6. The method of claim 1 wherein the step of determining the level of engine-out $NO_x$ emissions entering the lean $NO_x$ catalyst is performed by using a $NO_x$ model incorporating actual operating conditions.

7. The method of claim 1 wherein the step of determining the maximum $NO_x$ level processed by the $NO_x$ catalyst is performed by using said $NO_x$ model incorporating actual operating conditions.

8. The method of claim 1 wherein the step of determining the level of engine-out Nox emissions entering the lean $NO_x$ catalyst is performed by disposing a sensor upstream of the $NO_x$ catalyst.

9. The method of claim 8, further comprising the step of forming the sensor as $NO_x$ sensor.

10. The method of claim 9 further comprising the step of utilizing the $NO_x$ sensor in combination with the temperature sensor.

11. The method of claim 8 wherein the step of determining the maximum $NO_x$ level processed by the $NO_x$ catalyst is performed by using the sensor disposed upstream to the $NO_x$ catalyst.

* * * * *